United States Patent Office 2,826,481
Patented Mar. 11, 1958

2,826,481

METHOD OF EXTRACTING URANIUM VALUES FROM URANIUM BEARING MATERIAL

Frank Arthur Forward and Jack Halpern, Vancouver, British Columbia, Canada, assignors to Canadian Patents and Development Limited, Ottawa, Ontario, Canada, a company No Drawing. Application November 7, 1955
Serial No. 545,545

5 Claims. (Cl. 23—14.5)

This invention relates to a method of separating uranium values from copper values in the recovery of uranium values from uranium bearing material such as ores, concentrates, metallurgical residues, intermediates, by-products and the like which contain copper values in addition to uranium values.

This application is a continuation-in-part of our application No. 462,116, filed October 13, 1954, now Patent No. 2,797,977, issued July 2, 1957.

Uranium usually is found in nature as an oxide, such as pitchblende, $U_3O_8$, or a phosphate such as torbernite, metatorbernite and autunite or associated with values of other metals such as with vanadium as carnotite, a uranium vanadate. Uranium may be and frequently is associated in ore deposits and in uranium bearing by-products, metallurgical intermediates and residues with values of other minerals, such as copper, from which the uranium must be separated to produce a uranium product suitable for laboratory and commercial use.

It is known that uranium can be extracted from uranium bearing materials by leaching the material with a dilute sulphuric acid solution in a closed reaction vessel maintained at elevated temperature and under a positive partial pressure of oxygen, such as produced by feeding an oxygen bearing, oxidizing gas into the reaction vessel during the course of the leaching operation.

This acid leaching method, which is described in detail in our co-pending application, Serial No. 462,116, filed October 13, 1954, has the important advantage that uranium values are rapidly extracted from the uranium bearing material and dissolved in the leach solution with a high degree of extractive efficiency. However, when acid leaching is employed to recover uranium values from copper bearing ores, the presence of copper results in excessive consumption of precipitation reagents and makes it difficult to recover a high grade uranium product from the leach solution. At least part of the copper values tend to dissolve in the leach solution and part remains in the residue. The residue can be treated separately, if desired, for the recovery of copper values. Separation of dissolved copper values from the leach solution, which contains dissolved uranium values can be effected, such as by cementation. For example, copper can be precipitated from dilute acid solution by the addition of iron, such as in the form of sheet metal. However, such precipitation methods are complicated and costly and, also, may constitute a source of loss of uranium values.

We have found that the problem of the presence of copper values with uranium values in uranium bearing material can be overcome in a surprisingly simple but highly effective manner. In general, the method of the present invention of separating copper values from uranium values comprises the step of digesting at a temperature above atmospheric temperature, in the presence of undissolved residue from the leaching step and iron sulphide, an aqueous acid sulphate solution containing, in solution, uranium values and copper values, and continuing the digesting for a period of time sufficient to precipitate copper values from the solution.

The method of the present invention is independent of the source or origin of the aqueous acid sulphate solution which contains the dissolved uranium and copper values. However, a preferred method of obtaining the solution, and which forms a feature of this invention, comprises the steps of forming a slurry of finely divided uranium bearing material containing copper values, iron sulphide and an aqueous solution of the group consisting of water and aqueous acid solution. The slurry is heated to and maintained at a temperature above about 80° C. in a closed reaction vessel. An oxygen bearing, oxidizing gas is fed into the reaction vessel in amount sufficient to maintain a partial pressure of oxygen in the reaction vessel. The reaction is continued to dissolve uranium values in the leach solution. When uranium values have been extracted from the uranium bearing starting material to the desired extent, the flow of oxygen bearing, oxidizing gas to the reaction vessel is stopped and the slurry is digested in the presence of iron sulphide and undissolved residue at a temperature above atmospheric temperature with agitation until dissolved copper values precipitate from the solution. Undissolved residue and precipitated copper values are separated from the leach solution, such as by filtration, and the leach solution is then ready for further treatment leading to the subsequent recovery therefrom of dissolved uranium values.

The effective leach solution is an aqueous acid solution having a pH value within the range of from about pH 3 to about pH 0.5. The acid can be formed in situ when mineral sulphides or elemental sulphur are associated with the uranium bearing material either occurring naturally with the uranium values or added to the slurry. Sulphuric acid is generated in the oxidation of mineral sulphides or elemental sulphur in aqueous solution. Thus, the starting solution can be water or water with a minor amount of sulphuric acid to accelerate the initial acid forming reaction, or to neutralize basic constituents such as calcium carbonate or magnesium carbonate which may be present in the uranium bearing starting material.

When mineral sulphides or elemental sulphur are not associated with the uranium bearing starting material in amount sufficient to produce and maintain the desired aqueous acid sulphate solution within the range of from about pH 0.5 to about pH 3, the desired acid concentration can be obtained by adding sulphuric acid to the slurry.

The method is, of course, independent of hypothetical considerations and is based on results obtained from operations conducted under varying conditions. However, the following equations illustrate the reactions which occur during the leaching step when using elemental sulphur or mineral sulphides to form sulphuric acid in situ and the reaction between sulphuric acid and uranium values:

(1) $S + 1\tfrac{1}{2}O_2 + H_2O \rightarrow H_2SO_4$
(2) $2FeS_2 + 7\tfrac{1}{2}O_2 + 4H_2O \rightarrow Fe_2O_3 + 4H_2SO_4$
(3) $U_3O_8 + 1\tfrac{1}{2}O_2 + 3H_2SO_4 \rightarrow 3UO_2SO_4 + 3H_2O$ Other uranium minerals such as torbernite, metatorbernite, carnotite, autunite, and the like have been found to react with sulphuric acid under oxidizing conditions with resulting extraction and dissolution of uranium values.

We have found further that provided iron sulphide, preferably pyrite, $FeS_2$, is present in the slurry, at least the major portion of the dissolved copper values can be precipitated by stopping the flow of oxygen bearing, oxidizing gas to the reaction vessel after the uranium values have been extracted from the starting material to the desired extent and thereafter retaining, or digesting, the slurry for a short period of time with agitation at or about the leaching temperature. Iron sulphides present in the slurry appear to react with dissolved copper values during this digesting period and convert them to and precipitate them as copper sulphite. The precipitation of copper values by the iron sulphide can be expressed by the following equations:

(4)    $Cu^{++} + FeS \rightarrow CuS + Fe^{++}$
(5)    $Cu^{++} + FeS_2 \rightarrow CuS + Fe^{++} + S$
(6)    $Cu^{++} + 2FeS \rightarrow Cu_2S + Fe^{++} + S$ These reactions and others having a similar effect appear to be favoured by the relatively high temperature and low acidity conditions which are characteristic of the preferred method of leaching described above. The extraction and dissolution of copper values is favoured by high oxygen concentrations and for the best results the oxygen concentration should be maintained as low as possible consistent with a satisfactory leaching rate and extraction efficiency of desired uranium values. An oxygen partial pressure of from 5 to 25 pounds per square inch, preferably from 5 to 10 pounds, equivalent to from 5 to 125, or from 25 to 50 pounds, per square inch air pressure is very satisfactory.

Some iron is dissolved in the solution as a result of the copper precipitation reaction, probably in the form of ferrous salts, but it does not interfere with the subsequent treatment of the solution for the recovery of the uranium values.

The following examples illustrate the operation of the method. In accordance with conventional practice, amounts of uranium are referred to as grams per litre $U_3O_8$ or percent $U_3O_8$. It is understood, of course, that the uranium need not be present as $U_3O_8$ but may exist in other forms, such as in solution as $UO_2SO_4$.

*Example 1*

A uranium bearing ore containing about 1.17% $U_3O_8$; about 7.3% Cu; about 4.4% Fe; about 4.6% S; about 25% $Al_2O_3$ and about 44.2% $SiO_2$ was ground so that about 70% passed through a 200 mesh screen. That is, the particle size was less than 0.0029 inch. A slurry of about 2,000 grams of this ore was formed with water, about 50% solids by weight, and the slurry was charged into an autoclave wherein it was heated with continuous active agitation to and maintained at about 160° C. under a partial pressure of oxygen of about 10 pounds per square inch above the pressure autogenously generated at the temperature at which the reaction was conducted. At the end of a 4 hour leaching period, the pH value of the solution was about 1.8 and the solution contained about 10 grams per litre $U_3O_8$; about 23.4 grams per litre Cu; about 2.0 grams per litre Fe; and about 51 grams per litre $SO_4$. This represented extractions of 93% $U_3O_8$, 34% Cu and 37% S. At the end of the 4 hour leaching period, the flow of oxidizing gas was stopped and the slurry was digested at about 160° C. with active agitation for about 2 hours. At the end of the digestion period, undissolved residue was separated from the solution by filtration and the resulting solution had a pH value of about 1.3 and contained about 11.2 grams per litre $U_3O_8$; about 6.8 grams per litre Cu; about 12 grams per litre Fe; and about 58 grams per litre $SO_4$. The resulting solution represented extractions of about 94% $U_3O_8$; about 43% S and about 10% Cu. About 90% of the copper was retained in the undissolved residue for recovery, if desired, separately as a copper concentrate such as by flotation.

The uranium bearing ore in this example contained sufficient iron sulphide in naturally occurring form to provide all the acid necessary for the extraction of the uranium values and for the precipitation of dissolved copper values.

*Example 2*

A uranium bearing material which contained about about 0.56% $U_3O_8$; about 4.4% Cu; about 3.6% Fe; about 3.9% S; about 2.7% $CaCO_3$; about 6.7% $MgCO_3$; about 22.5% $Al_2O_3$; about 45.5% $SiO_2$ was ground to about 70% minus 200 mesh screen. About 2,000 grams of this ore was mixed with about 2,000 grams of water to form a slurry. The slurry was heated to and maintained at a temperature of about 160° C. for about 4 hours with active agitation in an autoclave maintained under an oxygen partial pressure of about 10 pounds per square inch. The solution remained at a pH value of about 7, no free acid was present in the solution and no uranium or copper values were dissolved. The failure of this experiment was attributed to the presence of the relatively large amount of $CaCO_3$ and $MgCO_3$ which consumed the small amount of acid formed in the oxidation of the iron sulphide.

*Example 3*

Experiment 2 was repeated with the addition of about 75 grams of sulphuric acid to the original slurry. After 4 hours, the pH value of the solution was reduced to about 2.8 and the solution was found to contain, after separation of the undissolved residue by filtration, about 5.9 grams per litre $U_3O_8$ and about 27.4 grams per litre Cu representing an extraction of about 87% of the $U_3O_8$ and about 43% of Cu from the starting material and dissolved in the solution.

*Example 4*

Example 2 was repeated with the addition of about 200 grams of pyrite and about 75 grams $H_2SO_4$. The slurry was heated to and maintained at a temperature of about 160° C. with active agitation under an oxygen partial pressure of about 10 pounds per square inch. At the end of a 4 hour leaching period, the pH value of the solution was reduced to about 1.5. The solution contained about 5.8 grams per litre $U_3O_8$ and about 12.7 grams per litre Cu, representing an extraction of about 93% of the uranium and about 27% of the copper. The pyrite apparently reacted with the oxygen to provide additional sulphuric acid which improved the uranium recovery. At the same time, the copper extraction was reduced. At the end of the 4 hour leaching period, the flow of oxygen to the autoclave was stopped and the solution was digested at about 170° C. for about 3 hours. Undissolved residue was separated from the solution by filtration and the resulting solution contained about 6 grams per litre $U_3O_8$ and about 0.1 gram per litre Cu representing an extraction of about 91% of the $U_3O_8$ and only about 0.3% of the Cu. The undissolved residue was subjected to a conventional flotation operation which resulted in the recovery of about 95% of the copper as a concentrate comprising about 10% of the original weight of the uranium-copper bearing starting material. The copper concentrate assayed 40% copper.

One of the important advantages of the present method of separating copper values from uranium values is that copper reports in the solid residue as a sulphide which can be recovered very easily and efficiently as a flotation concentrate in ideal condition for the recovery therefrom of copper metal by conventional methods.

The efficiency of the present method is influenced by the acid concentration of the leach solution, the amount of iron sulphide present in the slurry, and the temperature and pressure at which the reaction is conducted.

It may be necessary to add sulphuric acid to supplement any deficiency in the acid forming constituents of the charge and to neutralize basic constituents such as calcium carbonate and magnesium carbonate. Maximum leaching results are obtained when the leaching operation is conducted with a solution having a pH value within the range of from about pH 3 to pH 0.5. When pyrite or pyrrhotite is present in the slurry, the acid concentration of the solution adjusts itself automatically within the range of from about pH 3.0 to about pH 0.5 by hydrolysis of dissolved iron in the solution. The amount of free sulphuric acid necessary for operation of the present method, however, usually is less than any conventional leaching methods by the amount of acid which is generated through autoxidation of sulphides with which the uranium values are associated or which are added to the slurry. An excess of free acid is undesirable as it favours extraction and dissolution of copper values and hinders their reprecipitation. No acid addition usually is necessary where basic constituents are substantially absent from the ore and mineral sulphides or elemental sulphur are present in amount sufficient to provide the acid required to dissolve the uranium values by autoxidation.

The beneficial effect of the presence of iron sulphides such as pyrite in the leaching and digestion steps in the separation of copper values from uranium values, is effectively demonstrated by a comparison of the results obtained in Examples 3 and 4 above. The amount of iron sulphide required depends upon the character of the ore and particularly on its content of copper and basic constituents. Iron sulphide must be present during both steps to restrict the extraction of copper from the starting material and to convert dissolved copper values to and precipitate them from the solution as copper sulphides. The specific amount of iron sulphide necessary for the treatment of a particular uranium bearing material can be readily calculated, having regard to equations 4, 5 and 6 above, with provision for sufficient excess to ensure optimum precipitation of dissolved copper values. Usually, from 1% to 10% by weight of the ore is sufficient.

The leaching rate and extractive efficiency vary directly with the temperature of operation. Optimum results are obtained by operating at relatively high temperatures of the order of from about 100° C. to about 200° C. For example, the time of retention in the autoclave to obtain a desired uranium extraction is reduced and the amount of copper which is dissolved with the uranium values is reduced. It is therefore advantageous to employ the highest practicable temperatures and the temperature range of from about 140° C. to about 180° C. is especially recommended. Also, a relatively high temperature appears to be particularly desirable for the digestion or copper precipitation step.

In some cases, an oxidizing agent such as oxygen, in the form of air, oxygen enriched air or oxygen alone is essential to the progress of the leaching operation. However, the extraction of copper from the starting material appears to vary directly with the partial pressure of oxygen, that is, copper is more sensitive than is uranium to the partial pressure of oxygen which is maintained in the autoclave. Consequently, it is preferred to operate at the lowest possible oxygen partial pressure consistent with satisfactory uranium recoveries. Optimum results appear to be obtained, having regard to the rate and the efficiency of the extraction of uranium and copper values, under partial presures of oxygen within the range of from about 5 to about 10 pounds per square inch.

The method of the present invention possesses a number of important advantages. The acid concentration of the leach solution is relatively low and the temperature and pressure at which the method is conducted are moderate making it possible to employ conventional and relatively inexpensive apparatus. Also, the leaching operation proceeds rapidly with high uranium extractive efficiency. The copper precipitation step can be conducted inexpensively either as a continuation of the leaching step and in the same vessel or it can be conducted as a separate operation in a separate vessel. It is very effective for separating at least the major portion of the dissolved copper values from the solution. Also, of course, copper values report in the solid residue in a form in which they can be recovered readily and efficiently by conventional processes.

What we claim as new and desire to protect by Letters Patent of the United States is:

1. The method of recovering uranium values from uranium bearing starting material containing copper values which comprises the steps of forming a slurry comprised of finely divided uranium bearing material containing copper values, iron sulphide and an aqueous solution of the group consisting of water and an aqueous acid sulphate solution, heating the slurry to a temperature above about 80° C. in a closed reaction vessel, feeding an oxygen bearing, oxidizing gas into the reaction vessel in amount sufficient to maintain a partial pressure of oxygen in the vessel, continuing the reaction to dissolve uranium values in the leach solution, stopping the flow of oxygen bearing, oxidizing gas to the reaction vessel, digesting the slurry of leach solution containing dissolved metal values, iron sulphide and undissolved residue at a temperature above atmospheric temperature for a period of time sufficient to precipitate at least a major portion of the dissolved copper values from the solution, and separating leach solution containing dissolved uranium values from the undissolved residue and precipitated copper values.

2. The method of recovering uranium values from uranium bearing starting material containing copper values which comprises the steps of forming a slurry comprised of finely divided uranium bearing material containing copper values, iron sulphide and an aqueous solution of the group consisting of water and aqueous acid sulphate solution, heating the slurry to a temperature above about 80° C. in a closed reaction vessel, feeding an oxygen bearing, oxidizing gas into the reaction vessel in amount sufficient to maintain a partial pressure of oxygen in the vessel, continuing the reaction to dissolve uranium values in the leach solution, the iron sulphide being present in excess of the amount necessary to maintain the pH value of the solution within the range of from about pH 3 to about pH 0.5 during the oxidation reaction, stopping the flow of oxygen bearing, oxidizing gas to the reaction vessel, digesting the slurry of leach solution containing dissolved metal values, iron sulphide and undissolved residue at a temperature above atmospheric temperature for a period of time sufficient to precipitate at least a major portion of the dissolved copper values from the solution, and separating leach solution containing dissolved uranium values from the undissolved residue and precipitated copper values.

3. The method of recovering uranium values from uranium bearing starting material containing copper values which comprises the steps of forming a slurry comprised of finely divided uranium bearing material containing copper values, iron sulphide and an aqueous solution of the group consisting of water and an aqueous acid sulphate solution, heating the slurry to a temperature above about 80° C. in a closed reaction vessel, feeding an oxygen bearing, oxidizing gas into the reaction vessel in amount sufficient to maintain a partial pressure of oxygen within the range of from about 5 to about 25 pounds per square inch, continuing the reaction to dissolve uranium values in the leach solution, stopping the flow of oxygen bearing, oxidizing gas to the reaction vessel, digesting the slurry of leach solution containing dissolved metal values, iron sulphide and undissolved residue at a temperature above atmospheric temperature for a period of time sufficient to precipitate at least a major portion of the dissolved copper values from the solution, and separating leach solution containing dissolved uranium values from the undissolved residue and precipitated copper values.

4. The method of recovering uranium values from uranium bearing starting material containing copper values which comprises the steps of reacting in a closed reaction vessel, a slurry comprised of finely divided uranium bearing material containing copper values, iron sulphide and an aqueous acid sulphate solution having a pH value within the range of from about pH 0.5 to about pH 3 at a temperature within the range of from about 100° C. to about 200° C. with an oxygen bearing, oxidizing gas, said gas being fed into the reaction vessel in amount sufficient to maintain a partial pressure of oxygen in the vessel, continuing the reaction to dissolve uranium values in the leach solution, stopping the flow of oxygen bearing, oxidizing gas to the reaction vessel, digesting the slurry of leach solution containing dissolved metal values, iron sulphide and undissolved residue at a temperature above atmospheric temperature for a period of time sufficient to precipitate at least a major portion of the dissolved copper values from the solution, and separating leach solution containing dissolved uranium values from the undissolved residue and precipitated copper values.

5. The method of recovering uranium values from uranium bearing starting material containing copper values which comprises forming a slurry comprised of finely divided uranium bearing material containing copper values and an aqueous acid sulphate solution having a pH value within the range of from about pH 3 to about pH 0.5, heating the slurry to and maintaining it at a temperature above about 80° C. in a closed reaction vessel, feeding an oxygen bearing, oxidizing gas into the reaction vessel in amount sufficient to maintain a partial pressure of oxygen in the vessel, continuing the reaction to dissolve uranium values in the leach solution, stopping the flow of oxygen bearing, oxidizing gas to the reaction vessel, digesting the slurry of leach solution containing dissolved metal values, iron sulphide and undissolved residue at a temperature above atmospheric temperature for a period of time sufficient to precipitate at least a major portion of the dissolved copper values from the solution, and separating leach solution containing dissolved uranium values from the undissolved residue and precipitated copper values.

References Cited in the file of this patent

UNITED STATES PATENTS

| | | |
|---|---|---|
| 1,098,282 | McCoy | May 26, 1914 |
| 2,662,009 | Roberts et al. | Dec. 8, 1953 |

OTHER REFERENCES

Engineering and Mining Journal, vol. 155, No. 9 (September 1954), pp. 104–109.